United States Patent [19]
Keller

[11] Patent Number: 5,289,389
[45] Date of Patent: * Feb. 22, 1994

[54] DEVICE FOR MEASURING RESPONSE SPEED AND ACCURACY

[76] Inventor: Lloyd E. Keller, 3371 S. 114th Ave., Omaha, Nebr. 68144

[ * ] Notice: The portion of the term of this patent subsequent to Jan. 7, 2009 has been disclaimed.

[21] Appl. No.: 817,543

[22] Filed: Jan. 7, 1992

Related U.S. Application Data

[63] Continuation-in-part of Ser. No. 394,922, Aug. 16, 1989, Pat. No. 5,079,726.

[51] Int. Cl.$^5$ .............................................. G01B 7/00
[52] U.S. Cl. .................... 364/551.01; 364/550; 364/569; 364/410; 364/717; 434/327; 434/258; 434/231; 273/85 G; 273/440; 273/445; 273/446
[58] Field of Search ................. 377/20; 180/272, 287; 434/236, 327, 258, 247, 227, 201, 231; 273/85 G, 440, 445, 446, 454, 460; 364/709.01, 709.02, 717, 410, 569, 551.01, 550, 413.62

[56] References Cited

U.S. PATENT DOCUMENTS

| | | | |
|---|---|---|---|
| 3,426,450 | 2/1969 | Insenhour | 35/22 |
| 3,675,339 | 7/1972 | La Marca | 35/6 |
| 3,744,157 | 7/1973 | Dallas | 35/40 |
| 4,337,047 | 6/1982 | Hatta | 434/434 |
| 4,358,275 | 11/1982 | Paraghamian et al. | 434/258 |
| 4,464,121 | 8/1984 | Perelli | 434/236 |
| 4,692,863 | 9/1987 | Moosz | 364/364 |
| 4,713,787 | 12/1987 | Rapp | 364/364 |
| 4,730,253 | 3/1988 | Gordon | 364/434 |
| 4,755,140 | 7/1988 | Rimland | 273/446 |
| 4,770,636 | 9/1988 | Buschke | 273/460 |
| 4,819,818 | 4/1989 | Simkus et al. | 364/410 |
| 4,978,129 | 12/1990 | Komeda et al. | 434/201 |
| 4,978,303 | 12/1990 | Lampbell | 434/247 |
| 5,079,726 | 1/1992 | Keller | 364/551.01 |

OTHER PUBLICATIONS

The New York Times, *Omaha World-Herald*, "Job Test Screens for Impairment Protects Privacy", Mar. 11, 1990, Section G–p. 1.

Primary Examiner—Jack B. Harvey
Assistant Examiner—Hal D. Wachsman
Attorney, Agent, or Firm—John A. Beehner

[57] ABSTRACT

A response speed and accuracy measurement device includes a multidigit code generator for generating a multidigit code of numeric or alphabetic characters or other symbols. A start switch causes a code to be generated and displayed for a limited time duration. The operator then attempts to enter the last displayed code as quickly as possible using the data entry keys of a keyboard. A timer measures the operator's response time. A comparator checks the entered code against the displayed code for detecting a match. An output is generated in the event of a match to indicate the operator's response time.

18 Claims, 3 Drawing Sheets

DEVICE FOR MEASURING RESPONSE SPEED AND ACCURACY

CROSS REFERENCE TO RELATED APPLICATION

This is a continuation-in-part of patent application Ser. No. 07/394,922 filed on Aug. 16, 1989, now U.S. Pat. No. 5,079,726, issued Jan. 7, 1992.

BACKGROUND OF THE INVENTION

The present invention is directed generally to a device for measuring an operator's response speed and accuracy and more particularly to an electronic device for displaying a multidigit code for a limited period of time and then measuring the response time of an operator for entering the displayed code.

Most human activities require visual recognition followed by a directed physical response. In some cases, the proficiency of an individual is directly related to the speed and accuracy of the response. Examples include participants in team sports, automobile drivers, computer operators and many others.

Whereas various electronic devices, such as calculators and personal computers are capable of displaying data and receiving input through a keyboard entry system, no known devices perform the simple function of measuring the operators response time for keying in the digits of a previously displayed number.

Accordingly, a primary object of the invention is to provide a device for measuring the response time of an operator for entering the digits of a previously displayed multidigit code.

Another object is to provide such a device which provides a visual indication of the operator's response time.

Another object is to provide such a device wherein the operator enters the digits of the displayed code by a keyboard.

Another object is to provide such a device wherein the keyboard includes a plurality of data entry keys arranged in a pattern wherein all keys are substantially equally conveniently accessible to eliminate response time variances due to keyboard position.

Another object of the invention is to provide a response speed and accuracy measurement device which is simple to operate.

Another object is to provide such a device which may be embodied in a small hand held casing.

Another object is to provide such a device which is adaptable to accommodate individuals of different ages and proficiency levels.

A more specific object is to provide such a device having the capability of varying the duration of time that a multidigit code is displayed.

Another specific object is to provide such a device having the capability of varying the number of digits in a displayed code.

Another object is to provide a response speed and accuracy measurement device which is simple and rugged in construction, economical to manufacture and efficient in operation.

SUMMARY OF THE INVENTION

The response speed and accuracy measurement device of the present invention includes a multidigit code generator operative to generate a multidigit code and a display operative to display the code for a limited time duration on the order of a fraction of a second. The operator then enters the displayed code as quickly as possible by keyboard keys and a timer measures the operators response time. The entered code is compared to the displayed code for producing a match signal or error signal, either or both of which may be used either to activate a display of the operator's accuracy and response time or to activate a separate circuit. A functional application of this device would be enabling an automobile ignition system for any operator who can accurately enter the displayed code in a predetermined response time.

It is contemplated that the device may be a computer programmed to operate as described above or preferably a small self-contained hand held unit. The device can be made equally challenging for persons of different ages and proficiencies by adjusting the duration of time that a code is displayed and by adjusting the number of digits in the displayed code. Likewise, whereas it is preferred that the displayed code consist of numeric characters for simplicity, alphabetic characters may be substituted or combined with the numeric characters for more diverse codes.

A standard test of the speed and accuracy of a particular directed human response would serve several important needs. It could assist in qualifying certain job or sports applicants. As in the above-described application, it could test a driver's ability to drive safely. It could also become a worldwide competition in itself for determining who has the fastest response time for preselected conditions relating to display time and number of digits.

DESCRIPTION OF THE PREFERRED EMBODIMENTS

Figure 1:
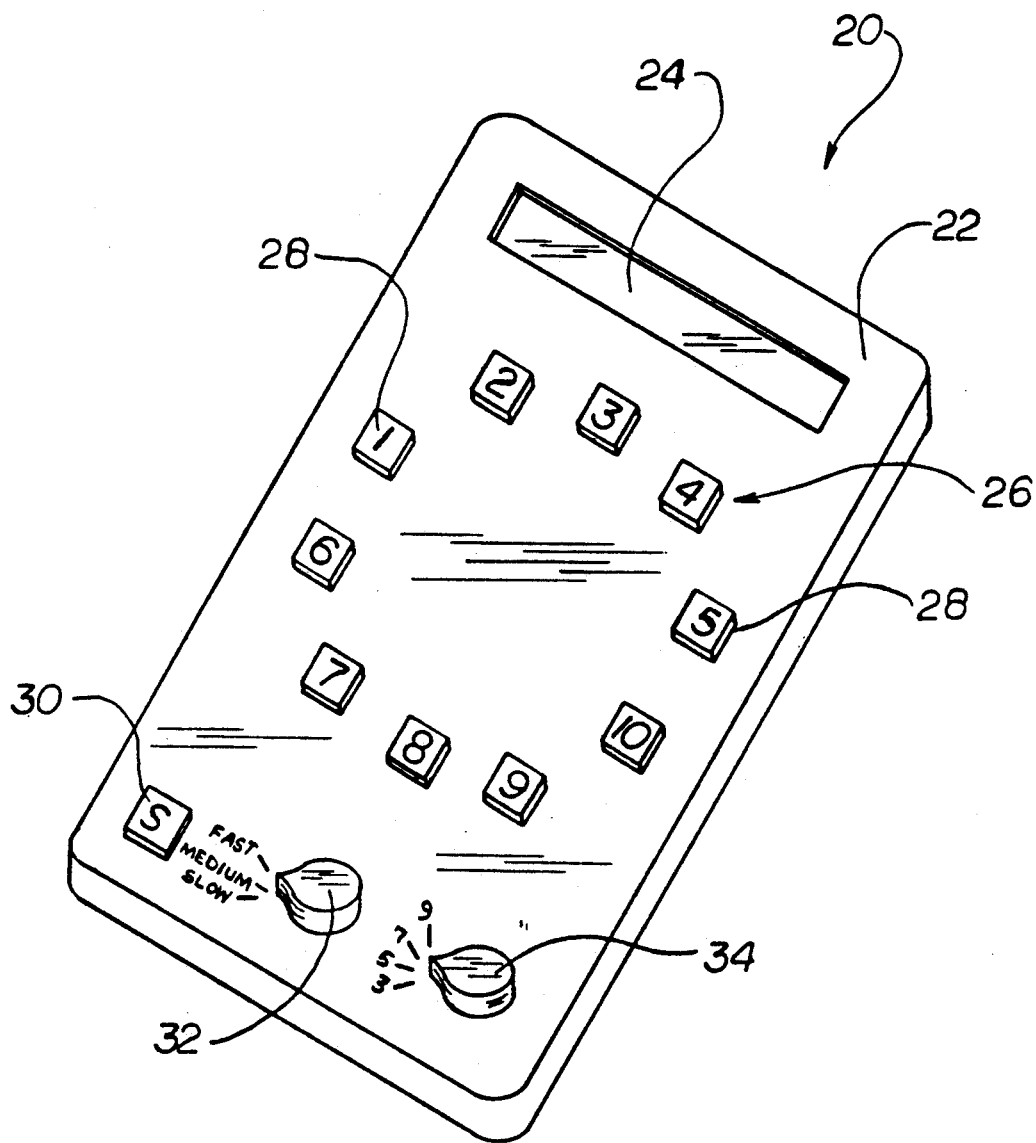
FIG. 1 is a perspective view of a response speed and accuracy measurement device of the invention.

The response speed and accuracy measurement device 20 of the present invention is illustrated in the form of a self contained hand held unit in FIG. 1. The device 20 includes a small thin casing 22 having a liquid crystal display 24 exposed on the top face thereof adjacent a keyboard 26, which includes ten numeric character entry keys 28 arranged in a circular pattern. Also, accessible on the face of casing 22 is a start button or switch 30, a displayed duration selector switch 32 and a "number of digits" selector switch 34.

In operation, an operator need only adjust the selector switches 32 and 34 to set the desired display duration and number of digits for the displayed code, and then hit the start button 30. Assuming the displayed duration is set at one half second and the number of digits is selected to be five, a five digit random number is displayed on the LCD 24 for one half second. The operator then enters that five digit number into the device by depressing the applicable keys 28 as quickly as he can. If he has entered the correct five digit number, that number will be displayed on the LCD 24 together with his actual response time, preferably in thousands of a second, i.e., "68537 1.685 SEC". If, on the other hand, the code entered by the operator does not match the displayed code, the LCD 24 would display an error code, such as a series of zeros. The operator can then immediately press the start button to repeat the test with a newly generated code.

The circular array of keys 28 is preferred for eliminating any response time variances due to the convenience of access to particular keys, such as the centrally situated "5" on a standard numeric keyboard arrangement. Additional parameters for the displayed code will furthermore eliminate time variances based on convenience. Such parameters may disallow any duplication of a digit in a single code; any adjacent sequential digits in a code and the numeral "1" as the first digit of any code. Other parameters may be imposed as desired. Further accuracy in the test results can be achieved by averaging the results of a selected number of tests for each operator.

Figure 2:
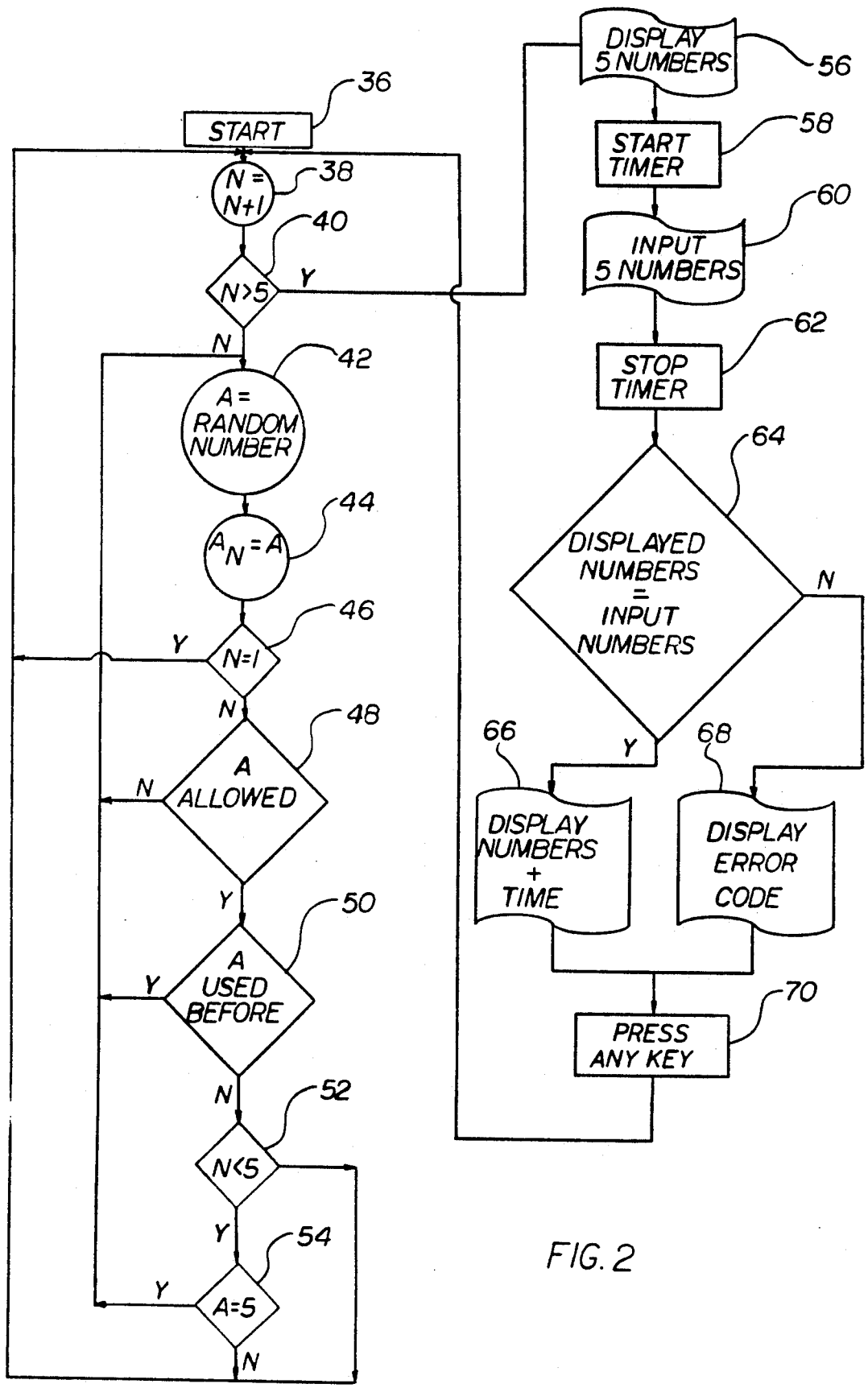
FIG. 2 is a flow chart for a software version of the invention.

The present invention may be embodied in a computer program according to the software illustrated in the flow chart of FIG. 2.

The device is activated in the "start" step 36 by pressing the return bar or possibly any key of the computer keyboard. Step 38 starts the digit counter by adding one to the value of N so that in the first cycle, N=1. Next, comparison step 40 checks whether all five digits have been selected. If so, the program proceeds to display step 56. If not, random number generator 42 generates the next digit which is assigned to the next digit symbol in step 44. Comparator step 46 checks whether that digit is the first digit. If so, it is accepted and the program returns to digit counter step 38 for generating the next digit. If not, the program proceeds to comparator step 48 wherein the selected digit is checked for whatever parameters are to be imposed. If the digit is not allowed, the program returns to the random number generator and if it is allowed, the program proceeds to comparator step 50 which checks for any duplication of digits. If that digit has previously been used in the same code, the program returns to the random number generator 42; otherwise it proceeds to comparator 52 which checks whether the program is handling the fifth digit. If it is handling the fifth digit, the program returns to the digit counter step 38; otherwise comparator 54 disallows the numeral 5 for the second, third and fourth digits of the code. If the digit is not "5", the program returns to digit counter 38 whereupon, after collecting five allowed digits, comparator 40 shifts the program to step 56 where the five digit code is displayed for a limited time. Activation of display 56 starts timer 58. The code is displayed only briefly. The operator then attempts to enter the displayed code at step 60 as fast as possible through the keys of the computer keyboard. Upon entry of the fifth digit, the timer is stopped at step 62 and comparator 64 is activated to check whether the input code matches the displayed code. If it does, the code and time are displayed in step 66; otherwise an error code is displayed in step 68. Thereafter, the operator need only press any key at step 70 to repeat the response speed and accuracy test.

Whereas the illustrated program is directed to the limited situation wherein the code is a five digit numeric code, it is to be understood that the code could be generated as alphabetic characters, punctuation characters, any other characters capable of input by the computer keyboard, or any combination of these. Likewise, provision could be made in the program to select the number of digits in the code and to select a predetermined time duration for the display in step 56.

Figure 3:
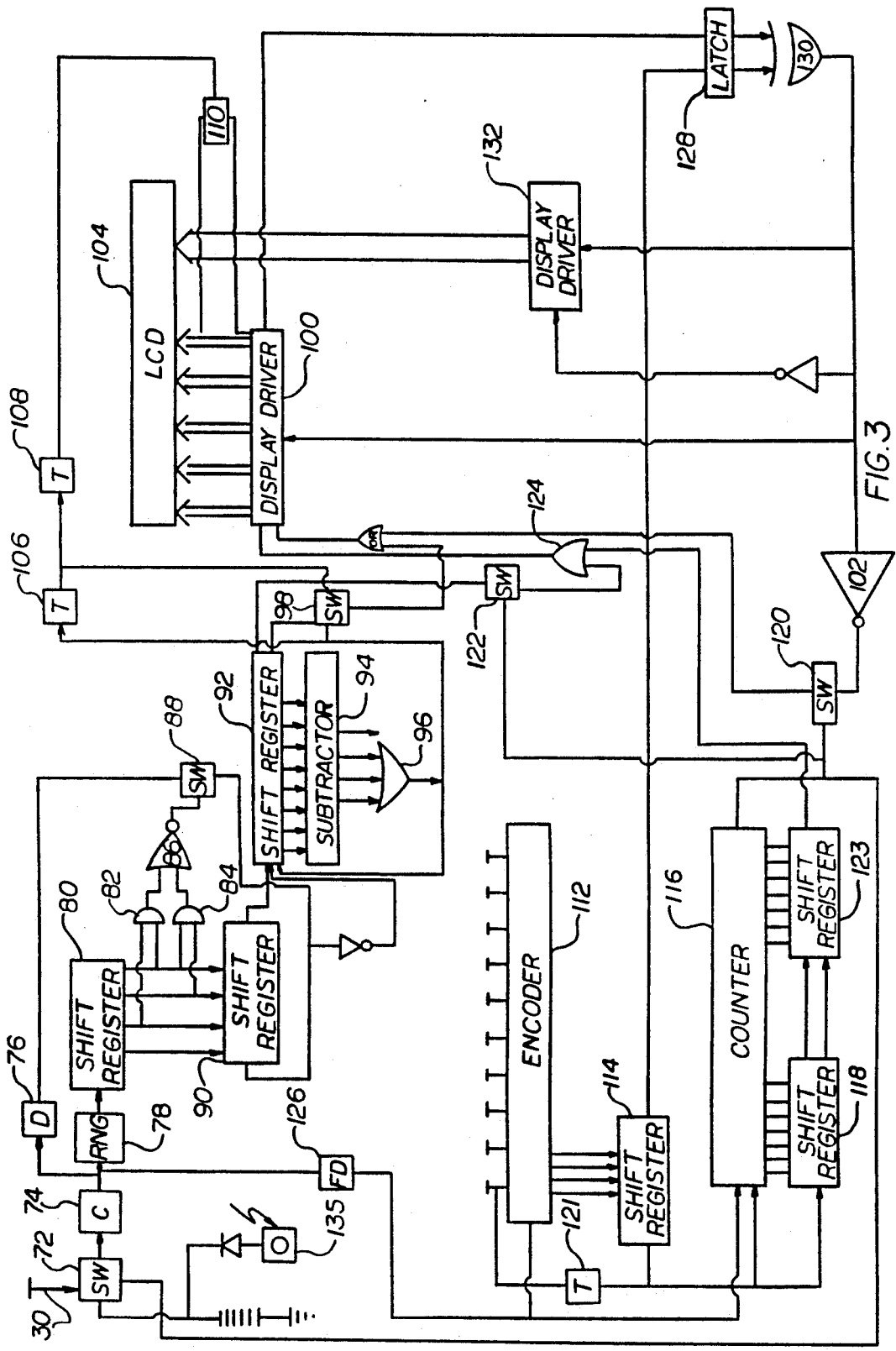
FIG. 3 is an electrical circuit diagram for a device of the invention.

The device 20 is preferably embodied in the small hand held casing 22 which may include the circuitry illustrated in FIG. 3.

To initiate a test, analog switch 72 is manually activated by pressing the start button 30. Voltage from battery 134 is then applied to clock 74 which is adjusted to the clock frequency of 100 kHz so that each clock pulse is 10 micro seconds. Clock 74 then activates the random number generator 78 which may be an MM5437 digital noise source commercially available from National Semiconductor. At each pulse, generator 78 shifts one bit of data into the series/parallel shift register 80. Upon shifting of 4 bits into shift register 80, the 3 most significant bits are screened through AND gates 82 and 84 and NOR gate 86 to assure that the 4 bit binary number collected in shift register 80 is not larger than 9. If the most significant right-hand bit is one, the second and third most significant bits must both be zero for the outputs of gates 82 and 84 to be zero. Nor gate 86 will not enable analog switch 88 if the output of either gate 82 or 84 is high.

If switch 88 is enabled, it is opened by a pulse from frequency divider 76 which has an output of ¼ of the frequency received from clock 74. The opening of switch 88 causes the four bit data in shift register 80 to be dropped into the parallel/series 4-bit shift register 90 which may be an MC14194, for example. If analog switch 88 is not enabled, due to the four bit number being larger than 9, random number generator 78 is pulsed four more times to replace the four bit number in shift register 80 which again is screened by gates 82, 84 and 86. Upon enablement of switch 88 and opening of the switch by frequency divider 76, the four bit number is dropped into the parallel/series shift register 90. If that register is active, 8 bits (two whole binary numbers, each corresponding to a decimal number smaller than or equal to 9) are shifted to the universal shift register 92. The parallel outputs of register 92 are applied to the subtracter 94 to eliminate any duplication of adjacent digits or side by side sequential digits. If the three most significant bits of the subtracter 94 output are all zero, i.e., if the result of the subtraction is either zero or one, the output of OR gate 96 disables switch 98, thereby preventing the 4½ digit LCD display driver 100 from being enabled. Display driver 100 may be an MM5483, for example.

At the same time, the zero from the first key 72 disables the analog switch 120 which prevents enabling of display driver 100 by inverter 102. Only if the output of OR gate 96 is high, indicating that the numbers in register 92 are not the same or in sequence, is driver 100 enabled to shift data from the shift register 92 to driver 100 for display on LCD 104. Shift register 92 may be a universal 8 bit shift register such as a CD4034 of National Semiconductor. LCD 104 is of the 8 (7½) digit type.

At the same time, OR gate 96 enables the timers 106 and 108. Timer 106 may be a 50 microsecond latch/timer and timer 108 may be an adjustable monostable multivibrator. Timer 108 is adjustable for varying the duration of the display of a multidigit code on LCD 104 between approximately 0.1 and 10 seconds. It may be preferable to provide timer 108 as a stepped switch having perhaps three (3) fixed settings of 0.2, 0.6 and 1.0 second to correspond to slow, medium and fast settings of selector switch 32 on casing 22. Whereas these settings are applicable for approximately five digit codes when testing adults, longer fixed settings, of perhaps 2, 6 and 10 seconds for example, may be preferred for longer codes or when testing children or impaired individuals. Many different settings within the finite range of approximately 10 seconds will be applicable for the many different conditions and types of individuals for which different tests are designed.

Timer 106 is adjusted to the 200 micro seconds necessary to fill display driver 100 and LCD display 104 with data, respectively. After that time interval, timer 106 disables switch 98, thus prevention further data input into display driver 100.

At the same time, timer 106 activates the adjustable timer 108 which determines the duration of the generated multidigit code displayed on LCD 104. After the selected duration, timer 108 turns off LCD 104, using the phase invertor of the analog switch 110.

Upon viewing the multidigit code displayed on LCD 104, the operator then attempts to enter the last displayed code, as quickly as possible, using the key 28 of the 10 to 4 encoder 112. When the first key 28 is pressed, several things happen at the same time. The binary output appears at the encoder 112; the 4-bit parallel/series shift register 114 is enabled; the decade counter 116 is disabled; the 8-bit parallel/series shift register 118 is enabled; the analog switch 120 is enabled permitting the enabling of display driver 100 through invertor 102; and the data stream from shift register 92 is interrupted by the analog switch 122. Even in the absence of a timer for limiting the display of the generated multidigit code, pressing of the first data entry key by the operator would perform the function of clearing the code from the display thereby requiring the operator to enter the code from memory.

The length of all these enabling or disabling intervals is determined by the 10 second monostable multivibrator/timer 121. The display driver 100 and the LCD 104 now get data exclusively from the shift registers 118 and 123 and OR gate 124. The counter 116 is clocked by the 1:100 frequency diver 126, i.e., with a frequency of 1 kHz. Thus the counter 116 counts in milliseconds up to ten thousand. The binary bits of that period are displayed as decimal numbers on LCD 104 to provide the visual indication of the operator's response time. Due to the appropriate configuration of the back plane of LCD 104, a decimal point is displayed after the first 1 and ½ digits (digit "1" counts as a half digit), and the display fields for the last three digits are now enabled.

Display driver 100 is then enabled in the following way. A one millisecond step is applied to the shift enabling pin of display driver 100. This causes an output bit from the series register of the display driver 100 to go to latch 128. At the same time, a bit from the parallel/series shift register 114 arrives at latch 128. Both bits have a period of one millisecond. In the latch 128, they adjust their simultaneous time and go into the EXCLUSIVE OR gate 130. If both inputs have the same level, display driver 100 is enabled through the output of gate 130 inverted by invertor 102. This enabled state lasts as long as the output of gate 130 is zero, i.e., both inputs have the same level. When the inputs have a different level, gate 130 disables the display driver 100 through invertor 102 and resets driver 100, and the three digit fixed display driver 132. Driver 132 gives either zero as an error code when reset or the characters "SEC" if enabled by gate 33 for displaying the operator's response time.

After a determined time, the overflow from counter 116 disables the input switch 72, erasing the display from LCD 104 and resetting all necessary parts. That completes one response time and accuracy test.

After a determined time, the overflow from counter 116 disables the input switch 72, erasing the display from LCD 104 and resetting all necessary parts. That completes one response time and accuracy test.

The supplied voltage is delivered by battery 134. If the output of battery 134 drops 0.7 volts below the voltage of an auxiliary solar cell 135, the solar cell recharges battery 134.

Whereas the response speed and accuracy measurement device of the invention has been shown and described in connection with preferred embodiments thereof, it is understood that many modifications, substitutions, and additions may be made which are within the intended broad scope of the appended claims. In the electrical circuit of FIG. 3, for example, it may be preferable to start the counter 116 for generating the operator's response time data, at the same time that timer 108 turns off the display of the generated multidigit code on LCD 104, rather than when the first key 28 is depressed by an operator. Thus any delay from the time the display is terminated to the time that the operator presses the first key 28, is included in the operator's response time measured at counter 116 and stored in registers 118 and 122 for display on LCD 104 if the operator enters the correct code. Whether the measurement of the response time begins instantaneously upon pressing of the start switch or immediately thereafter as triggered by sequential electronic elements is without any functional difference and both would be construed as starting the response time upon actuation of the start switch. Likewise, to impose a fixed delay between the actuation of the start switch and starting the timer for measuring the response time would be without consequence and considered as starting the response time upon actuation of the start switch so long as the delay is shorter than the fastest expected response time.

The duration of the display may be adjusted as desired but several discrete settings by a stepped switch 108 are preferred to accommodate operators of different ages and proficiencies. Likewise, it may be preferable to modify the circuit to accommodate the display of a code of more or less than five digits. This would likewise add further variation and accommodate users of different ages and proficiencies.

Thus there has been shown and described a response speed and accuracy measurement device which accomplishes at least all of the stated objects.

I claim:

1. A response speed and accuracy measurement device, comprising, a random number generator operative to generate a random multidigit code of digits selected from numeric characters, alphabetic characters and other symbols, an output means including a display operative to display said code, a start switch operatively associated with said random number generator and display and actuatable to cause said multidigit code to be generated and displayed on said display, a keyboard comprising a plurality of data entry keys by which an operator may enter the generated code, means for limiting the time duration of said generated code on said display in response to operation of said start switch to ten seconds or less to thereby remove the generated code from said display prior to the operator's entry of the generated code by memory, timer means for measuring the response time for an operator to enter the generated code by said keyboard, said response time beginning upon display of said multidigit code on said display in response to actuation of said start switch and ending upon actuation of the last of a number of data entry keys equal to the number of digits in said multidigit code whereby said response time tests the speed of both memory and physical response, check means for comparing the code entered by an operator to the generated code and for detecting a match of said codes and said output means being operatively connected to said timer means and check means for indicating the operator's response time and whether a match was detected by said check means.

2. The response speed and accuracy measurement device of claim 1 wherein said other symbols include shape designations.

3. The response speed and accuracy measurement device of claim 1 wherein said output means is operative to display an error code on said display in response to a mismatch detected by said check means.

4. The response speed and accuracy measurement device of claim 3 wherein said output means is operative to display said entered code in response to a match detected by said check means.

5. The response speed and accuracy measurement device of claim 1 wherein said keyboard, random number generator, start switch, timer means, check means and output means are electrically connected in a circuit which further comprises means for connection to a source of electric power.

6. The response speed and accuracy measurement device of claim 5 wherein said means for connection to a source of electric power includes means for electrical connection to a battery.

7. The response speed and accuracy measurement device of claim 6 wherein said means for connection to a source of electric power further comprises a solar cell as an alternate power source.

8. The response speed and accuracy measurement device of claim 1 wherein said data entry keys comprise a plurality of numerical digit entry keys.

9. The response speed and accuracy measurement device of claim 8 wherein said data entry keys consist of ten keys, each having a different numeral indicated thereon.

10. The response speed and accuracy measurement device of claim 1 wherein the data entry keys of said keyboard are arranged in a generally circular pattern.

11. The response speed and accuracy measurement device of claim 1 wherein said display comprises a liquid crystal display.

12. The response speed and accuracy measurement device of claim 1 wherein said means for limiting the time duration of said display comprises means for adjusting said time duration.

13. The response speed and accuracy measurement device of claim 1 further comprising means for adjusting the number of digits in the multidigit code generated by said random number generator.

14. The response speed and accuracy measurement device of claim 1 wherein said random number generator is operative to generate codes free of identical adjacent digits.

15. The response speed and accuracy measurement device of claim 14 wherein said random number generator is operative to generate codes free of adjacent sequential digits.

16. The response speed and accuracy measurement device of claim 15 wherein said random number generator is operative to exclude the numeral one from the first digit of each generated code.

17. A response speed and accuracy measurement device, comprising, a multidigit code random number generator operative to generate a multidigit code of digits selected from numeric characters, alphabetic characters and other symbols, an output means including a display operative to display said code, a start switch operatively associated with said random number generator and display and actuatable to cause said multidigit code to be generated and displayed on said display, a keyboard comprising a plurality of data entry keys by which an operator may enter the generated code, means for limiting the time duration of said generated code on said display in response to operation of said start switch to ten seconds or less to thereby remove the generated code from said display prior to the operator's entry of the generated code by memory, timer means for measuring the response time for an operator to enter the generated code by said keyboard, said response time beginning upon actuation of said start switch and ending upon actuation of the last of a number of data entry keys equal to the number of digits in said multidigit code whereby said response time tests the speed of both memory and physical response, check means for comparing the code entered by an operator to the generated code and for detecting a match of said codes, and said output means being operatively connected to said timer means and check means for indicating whether a match was detected within a prescribed time.

18. A response speed and accuracy measurement device, comprising, a random number generator operative to generate a random multidigit code of digits selected from numeric characters, alphabetic characters and other symbols, an output means including a display operative to display said code, a start switch operatively associated with said random number generator and display to cause said multidigit code to be generated and displayed on said display, a keyboard comprising a plurality of data entry keys by which an operator may enter the generated code, means for removing the generated code from said display in response to actuation of the first data entry key after actuation of said start switch to thereby remove the generated code from said display prior to the operator's entry of the generated code by memory, timer means for measuring the response time for an operator to enter the generated code by said keyboard, said response time beginning upon actuation of said start switch and ending upon actuation of the last of a number of data entry keys equal to the number of digits in said multidigit code whereby said response time tests the speed of both memory and physical response, check means for comparing the code entered by an operator to the generated code and for detecting a match of said codes and said output means being operatively connected to said timer means and check means for indicating the operator's response time and whether a match was detected by said check means.

* * * * *